United States Patent [19]

Friedberg

[11] 4,248,418
[45] Feb. 3, 1981

[54] RUNG FITTING FOR PLAYGROUND EQUIPMENT

[75] Inventor: Marvin P. Friedberg, New York, N.Y.

[73] Assignee: Cascade Pacific Lumber Company, Portland, Oreg.

[21] Appl. No.: 9,148

[22] Filed: Feb. 5, 1979

[51] Int. Cl.³ ............................................... A63B 1/00
[52] U.S. Cl. ..................................... 272/62; 272/113; 52/721; 211/105.5; 248/188; 256/65; 403/189
[58] Field of Search .................. 272/62, 63, 109, 113, 272/111, 85; 211/105.4, 105.5, 105.6; 403/187, 189, 190, 192, 200, 230, 258, 259, 264, 233, 252–264; 5/282 R, 286, 290, 292, 296, 299, 303, 304; 52/285, 455, 457, 656, 721, 726, 764, 765, 767, 769; 108/137, 153–159; 248/188, 218.4, 219.1, 219.4, 231.1, 225.3; 256/65, 67, 69

[56] References Cited

U.S. PATENT DOCUMENTS

| 2,293,168 | 8/1942 | Pirone | 211/105.4 X |
|---|---|---|---|
| 2,645,317 | 7/1953 | Staaf . | |
| 2,974,805 | 3/1961 | Brosseau | 211/105.5 |
| 3,218,068 | 11/1965 | Warman | 272/62 |
| 3,502,326 | 3/1970 | Schaeffer | 272/62 |
| 3,525,521 | 8/1970 | Sylvester | 272/62 |
| 3,572,511 | 3/1971 | Triplett | 211/105.6 |
| 3,574,510 | 4/1971 | Herman . | |
| 3,915,579 | 10/1975 | Offenbroich | 403/264 |
| 3,969,871 | 7/1976 | Ewers | 272/113 X |
| 4,124,317 | 11/1978 | Dauth | 403/264 X |

FOREIGN PATENT DOCUMENTS

| 126702 | 11/1949 | Sweden | 272/62 |
|---|---|---|---|
| 73548 | 10/1916 | Switzerland | 211/105.6 |
| 537706 | 7/1941 | United Kingdom | 211/105.4 |

Primary Examiner—Richard J. Apley
Attorney, Agent, or Firm—Klarquist, Sparkman, Campbell, Leigh, Hall & Whinston

[57] ABSTRACT

A rung assembly has an overall length just short of the spacing between a pair of posts to permit it to be positioned therebetween, after which the assembly can be mounted on the posts by means of axial bolts at the ends of the assembly.

The bolts are so housed by assembly end fittings that rotation of the fittings not only rotates the bolts but facilitates their outward axial movement as demanded by their engagement with the posts.

The assembly is of adjustable length to facilitate mounting it on variously spaced posts.

11 Claims, 5 Drawing Figures

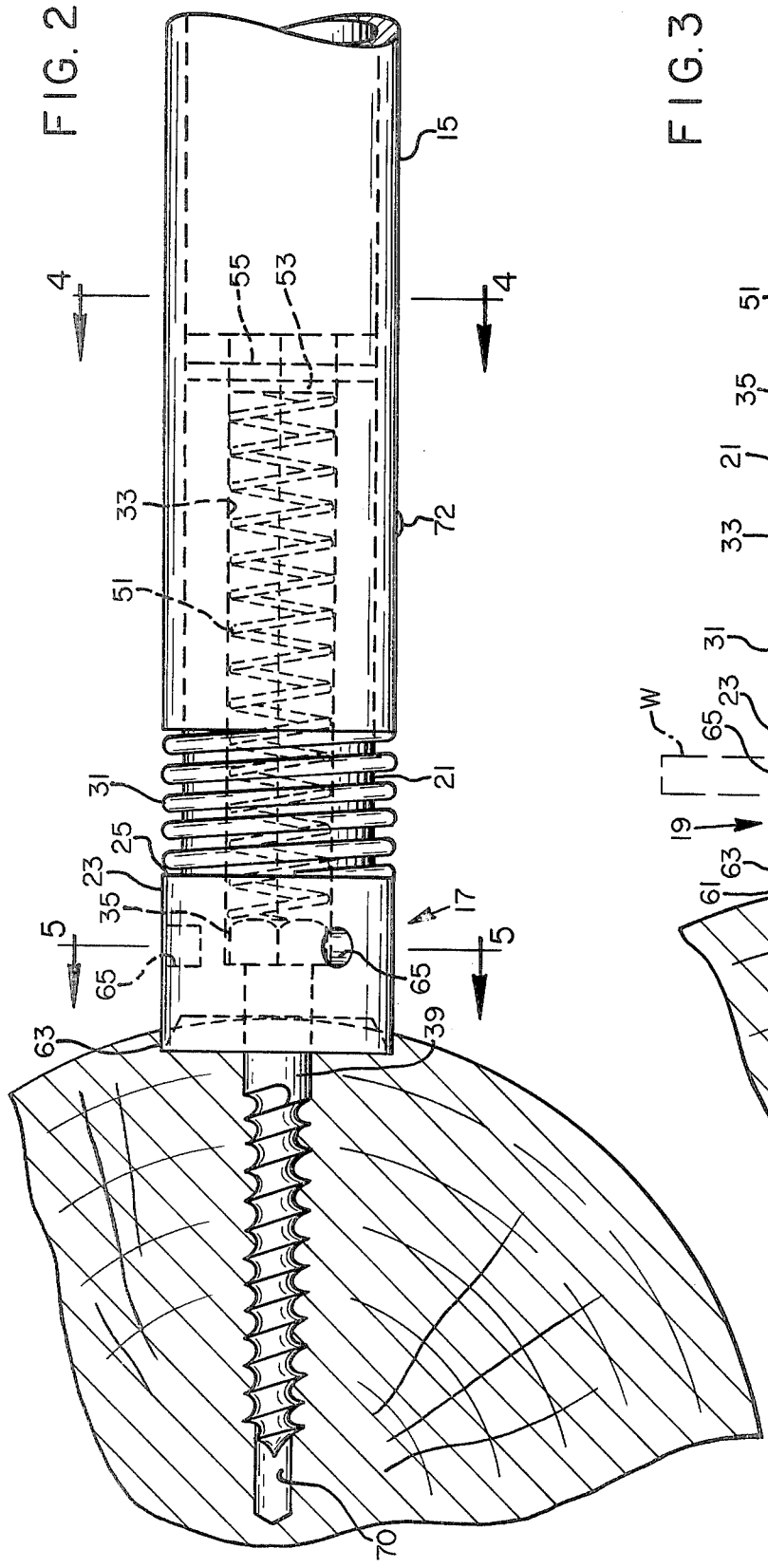
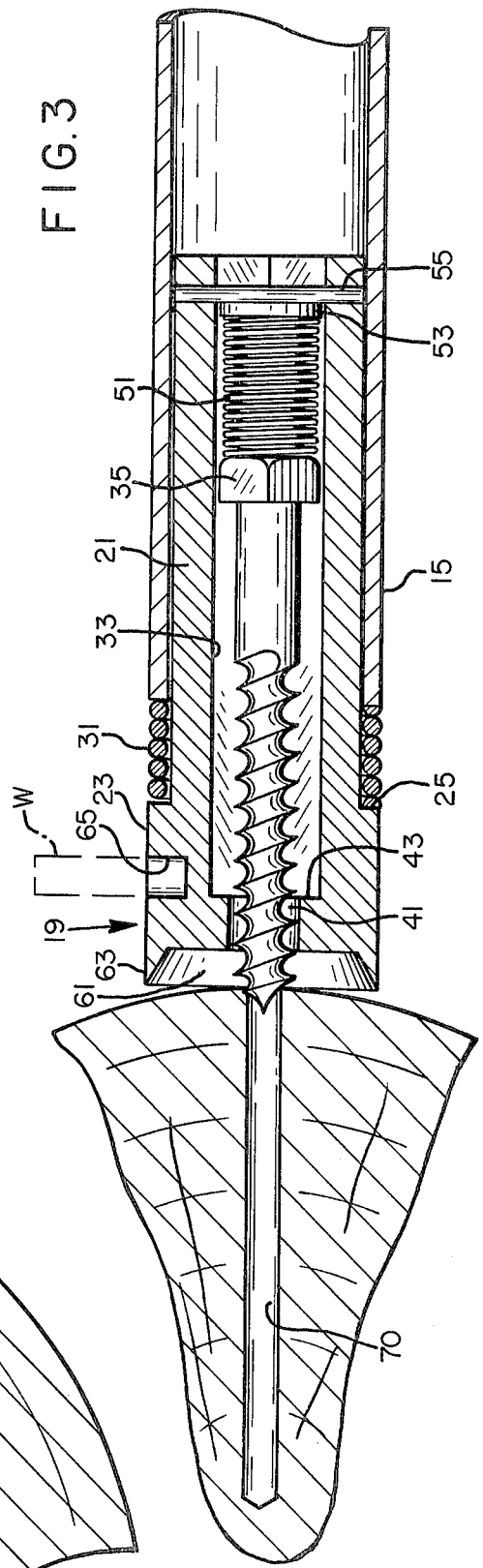

RUNG FITTING FOR PLAYGROUND EQUIPMENT

BACKGROUND OF THE INVENTION

The present invention relates to playground equipment and particularly to exercise equipment comprising one or more rungs mounted on upright posts.

It is known to mount rungs on posts in a variety of ways, but in general these have been either complicated or expensive, or need to be cut to size at the site.

SUMMARY OF THE INVENTION

The present invention provides a rung assembly readily mounted on spaced posts by means of axial end bolts. The invention in particular provides as assembly wherein the bolts are turned for securing purposes by rotation of assembly parts and wherein the bolts are so retractably housed that as they are rotated to thread into supporting posts, they may move outwardly as demanded by their threading movement.

The present invention also provides a rung assembly which is self-adjustable in length to fit posts whose spacing varies over a limited range, and requires only simple tools to mount it in place.

A main object of the present invention is to provide an improved rung assembly.

A further important object is to provide a fitting unit adapted to be used with standard rungs to produce an improved assembly.

The subject matter which I regard as my invention is particularly pointed out and distinctly claimed in the concluding portion of this specification. The invention, however, both as to organization and method of operation, together with further advantages and objects thereof, may be best understood by reference to the following description, taken in connection with the following drawings, wherein like reference characters refer to like elements.

DESCRIPTION OF THE DRAWINGS

FIG. 2 is an enlarged horizontal view of one end of the exercise device, with the post in section;

FIG. 3 is a view like FIG. 2 but showing the parts just prior to mounting the rung assembly on a post;

FIG. 1 shows a playground exercise device comprising a pair of upright wooden posts 11 and 13 implanted in any desired manner, in the ground or other surface. A rung assembly is mounted on and extends between the posts, and includes a hollow tubular rung 15 and a rung fitting unit 17 for each end of the rung. The fitting units are of identical construction.

Referring to FIGS. 1 and 2, each rung fitting unit includes a tubular rung fitting formed with a first portion 21 slidably fitting within the associated end of the rung. Each fitting is also formed with a second portion 23 which is larger in diameter than portion 21 (preferably the same exterior size as that of the rung) to provide a shoulder 25.

Figure 1:
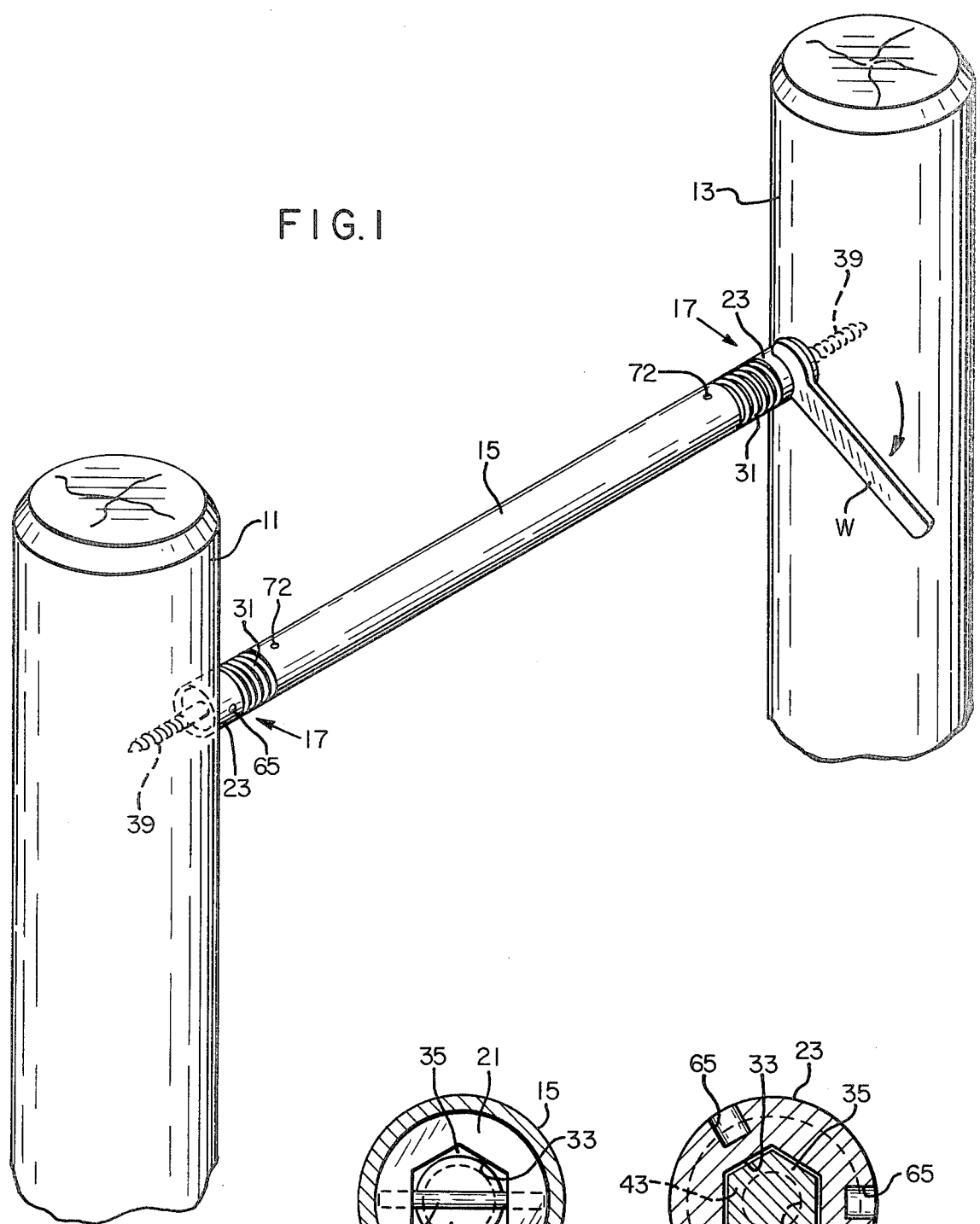
FIG. 1 is a perspective view of an exercise device of the present invention.
Figure 4:
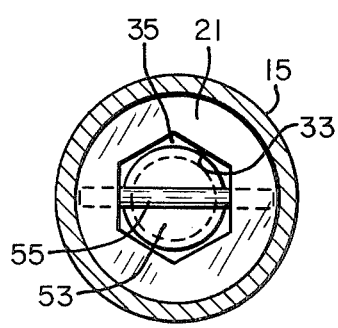
FIG. 4 is a cross section taken along line 4—4 of FIG. 2.
Figure 5:
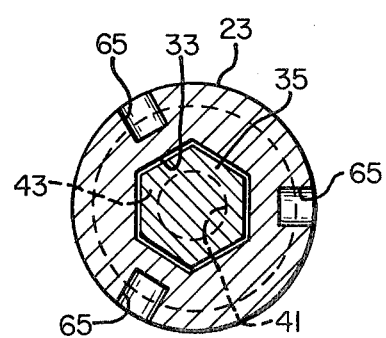
FIG. 5 is a cross section taken along line 5—5 of FIG. 2.

A spacer in the form of a compression spring 31, having squared ends, surrounds the small diameter portion 21 and bears at its opposite ends against the shoulder 25 and the associated end of the rung.

The rung fitting is formed with an axial bore 33 (FIG. 3) which extends through the smaller portion 21 and part way into the larger portion 23 of the fitting. The bore slidably but non-rotatably receives the head 35 of a securing bolt (being of the same cross sectional shape as the head). The bolt is in the form of a lag screw having a threaded shank 39. The latter passes through a hole 41 in the fitting and is threaded into the associated wooden post. The hole 41 is smaller than the bore 33 to provide an interior shoulder 43 against which the head 35 bears (in FIG. 2).

A compression spring 51 may be provided in the bore 33 between the screw and a stop comprising a washer 53 and a pin 55. The spring urges the screw outwardly as an aid when threading the screw into its post.

The larger portion 23 of the fitting is formed with a recess 61 at its outer end face to provide a sharp edge 63. Portion 23 is also provided with at least one and preferably three spanner wrench holes 65 (FIG. 2) for receiving a spanner wrench W (FIG. 1).

At the time of assembly, each post is drilled with a starter hole 70 (FIG. 3) to receive the tip portion of the associated lag screw. As the wrench W is actuated, to rotate a fitting and thus its lag screw, the screw is threaded into the post to bring the head thereof against the interior shoulder 43 (FIG. 2) and force the fitting against the post. Continued operation of the wrench will drive the edge 63 into biting engagement with the post (as shown in FIG. 2) for a more secure attachment.

After the lag screws are threaded home, the rung is preferably non-rotatably secured to the fittings, such as by pop rivets 72.

Each rung fitting and screw is so dimensioned that the screws can be retracted, against the resistance of the springs 51 into the fittings (or substantially so). The overall length of the rung assembly, with both screws retracted and with the smaller fitting portions retracted into the rung as far as permitted by the springs 31, is made to be only slightly less than the minimum spacing between the posts. This facilitates positioning of the assembly between the posts as the first step in mounting the rung assembly on the posts.

It is pointed out that since the rung slidably fits on the rung fittings, it can be secured by rivets 72 to the fittings in different relative positions, whereby to make the rung assembly adjustable in length. This means that there is greater freedom in implanting the posts since the rung assembly can be extended or contracted around a medium length to fit various post spacings.

To facilitate securing the rung to the fittings at various relative positions, the rung is provided with a hole near each end to receive a rivet. However, the rivet holes in the fittings are preferably drilled after the rung assembly is mounted on the posts, because their axial positions relative to the end portions of the rung is determined by the spacing of the particular posts on which the rung assembly has been mounted.

It is contemplated that the rung fitting units may be sold to customers already having their own rungs; or complete rung assemblies may be sold. In any event, the reference in the specification to sliding movement between the fitting and a rung applies to the parts prior to application of the pop rivets.

While I have shown and described a preferred embodiment of my invention, it will be apparent to those skilled in the art that changes and modifications may be made without departing from my invention in its broader aspects. I therefore intend the appended claims to cover all such changes and modifications as fall within the true spirit and scope of my invention.

What is claimed is:

1. A device of the class described, comprising:
   a rung fitting having a portion for rotatably receiving a rung,
   a bolt for securing said rung fitting to an upright support,
   and means providing a non-rotatable sliding fit between the bolt and the rung fitting to facilitate endwise threading movement of said bolt into the upright support upon rotation of the rung fitting, with the latter disposed in close proximity to the upright support.

2. A device of the class described, comprising:
   a rung fitting having a longitudinal axis,
   a bolt for securing said rung fitting to an upright support,
   means providing a non-rotatable coaxial sliding fit between said bolt and rung fitting,
   and said rung fitting having a portion for rotatably receiving a rung whereby to facilitate rotation of said rung fitting and consequent threading of said bolt into said upright support with said rung in place on said rung fitting.

3. A device as recited in claim 2 wherein said rung fitting is formed with an interior shoulder for engagement by the head of said bolt.

4. A device as recited in claim 2, wherein said rung fitting has an outwardly directed edge portion for biting engagement with a wooden upright.

5. A device as recited in claim 2 wherein said rung fitting has a second larger portion providing an exterior shoulder,
   a compression spring surrounding the first mentioned portion and contained between said exterior shoulder and the adjacent end of the rung.

6. A device as described in claim 3 wherein the rung fitting has an interior stop limiting inward movement of said bolt,
   an interior compression spring being disposed within said rung fitting between said interior stop and the head of said bolt,
   said rung fitting being formed for engagement by a tool to facilitate imparting turning movement to the rung fitting.

7. A device for installation between a pair of fixed position uprights, comprising:
   a rung,
   a rung fitting for each end of said rung,
   said fittings and rung having a combined length approximately equal to the distance between such uprights,
   each fitting having an elongate fastener for attaching engagement with the associated upright upon rotation of the associated fitting,
   each fastener being retractable within the associated fitting,
   said fasteners being coaxially arranged relative to said rung.

8. A device as described in claim 7 wherein said rung and fittings have sliding engagement with one another to make said device extensible for adaption to variously positioned posts.

9. A device as described in claim 8, including means for fixedly securing said fittings to said rungs.

10. An exercise device comprising:
    a pair of upright wooden posts mounted in fixed relation to one another,
    a rung assembly supported by said posts,
    said assembly including a rung and a fitting for each end of said rung,
    each fitting having a bolt in the form of a lag screw coaxial with said rung and having its pointed working end projecting outwardly from said fitting and threaded into the associated post to mount said assembly in place,
    said screws being retractable within said fittings to facilitate positioning said assembly between said posts,
    said rung and said fittings, apart from said lag screws, having a combined length approximately equal to the distance between said posts.

11. An exercise device of claim 10, wherein said assembly is extensible for adaption to the variations in spacing of posts.

* * * * *